No. 758,546. PATENTED APR. 26, 1904.
J. A. MANAHAN & S. WALDECK.
MEANS FOR SLIDING AND HOLDING PHONOGRAPHIC
RECORDS ON MANDRELS.
APPLICATION FILED FEB. 6, 1904.
NO MODEL.

WITNESSES:
William Miller
George Hulsberg

INVENTORS
Joseph A. Manahan
Siegfried Waldeck
BY
W. C. Hauff
ATTORNEY

No. 758,546. Patented April 26, 1904.

UNITED STATES PATENT OFFICE.

JOSEPH A. MANAHAN AND SIEGFRIED WALDECK, OF NEW YORK, N. Y.; SAID MANAHAN ASSIGNOR TO SAID WALDECK.

MEANS FOR SLIDING AND HOLDING PHONOGRAPHIC RECORDS ON MANDRELS.

SPECIFICATION forming part of Letters Patent No. 758,546, dated April 26, 1904.

Application filed February 6, 1904. Serial No. 192,415. (No model.)

*To all whom it may concern:*

Be it known that we, JOSEPH A. MANAHAN and SIEGFRIED WALDECK, citizens of the United States, residing at New York city, in the county and State of New York, have invented new and useful Improvements in Means for Sliding and Holding Phonographic Records on Mandrels, of which the following is a specification.

By means of this invention a record which is slid onto the cylinder of a phonograph can be guided to correct position without danger of fracture or injury to the record.

This invention is set forth in the following specification and claims and illustrated in the annexed drawings, in which—

Figure 1:
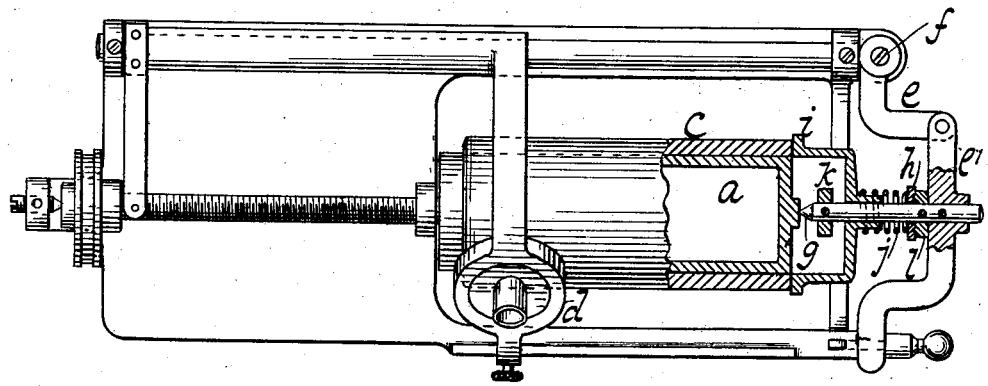
Figure 2:
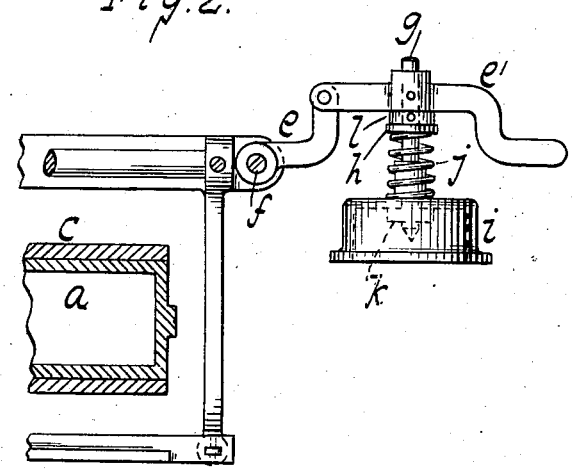

Figure 1 is a plan view of a phonograph or the like embodying this invention. Fig. 2 shows the holding means open or released.

In the drawings the letter $a$ designates a cylinder which is adapted to be rotated by a train of gears driven by a spring-motor or other means. This cylinder is adapted to receive a record $c$, which is slid onto the same and rotates therewith. The reproducer or recorder $d$ is given reciprocating motion along the record-cylinder to produce or record the sound-waves. The foregoing parts of the phonograph are well known. The device for guiding or sliding the record after the same has been placed on the cylinder comprises an arm $e$, which is pivoted at $f$ to the case or base of the machine. The arm is formed with a pivoted or jointed section $e'$. A center is shown at $g$. On this center is loosely or rotatably mounted a buffer-cap $i$, pressed by spring $j$ toward the record or toward a collar $k$, which latter prevents the cap sliding or dropping off the center when the cap is clear or away from the record.

The spring $j$ can rotate with the cap about or on the center. This spring sits at one end against the cap and engages at the opposite portion a rotary collar $h$, sitting against a collar $l$. This collar $l$ can be fixed or screwed to the center $g$.

The arm carrying the buffer-cap can be actuated to swing out of the path of the cylinder, so that the record is free to be slid from the same. When the record is slid onto the cylinder, the pivoted arm carrying the buffer-cap is actuated to bring the latter over the cylinder-head and in contact with the rim of the record to gently push the same into a correct line or position. It will be noticed that the buffer-cap also prevents the record from sliding off the cylinder when the machine is operated.

What we claim as our invention, and desire to secure by Letters Patent, is—

1. Means for holding or sliding phonographic records in place and comprising a center for a cylinder, and a rotary yielding or spring-pressed cap for the record.

2. Means for holding or sliding phonographic records in place and comprising a center, a rotary yielding cap and a washer for preventing the cap coming off the center.

3. A center, a rotary cap, a spring for the cap, a rotary washer to which the spring is engaged and a second washer against which the rotary washer sits or rotates.

4. A center, a rotary yielding or spring-pressed cap on the center, and a locking or holding arm for the center, said arm being composed of jointed sections.

In testimony whereof we have hereunto set our hands in the presence of two subscribing witnesses.

JOSEPH A. MANAHAN.
SIEGFRIED WALDECK.

Witnesses:
CHAS. E. POENSGEN,
MAX JUST.